United States Patent
Bahng et al.

(10) Patent No.: US 8,054,909 B2
(45) Date of Patent: Nov. 8, 2011

(54) METHOD OF SELECTING CANDIDATE VECTOR AND METHOD OF DETECTING TRANSMISSION SYMBOL

(75) Inventors: Seung Jae Bahng, Daejeon (KR); Jae Kwon Kim, Wonju-si (KR); Hoon Heo, Seoul (KR); Hyun Myung Wu, Suwon-si (KR); Youn-Ok Park, Daejeon (KR); Young Jo Bang, Daejeon (KR); Hyeong Sook Park, Daejeon (KR); Hoon Lee, Daejeon (KR); Young Ha Lee, Daejeon (KR); Jung Pil Choi, Daejeon (KR)

(73) Assignees: Samsung Electronics Co., Ltd, Suwon-si (KR); Electronics and Telecommunications Research Institute, Daejeon (KR)

( * ) Notice: Subject to any disclaimer, the term of this patent is extended or adjusted under 35 U.S.C. 154(b) by 704 days.

(21) Appl. No.: 12/141,539

(22) Filed: Jun. 18, 2008

(65) Prior Publication Data
US 2009/0135947 A1    May 28, 2009

(30) Foreign Application Priority Data
Nov. 22, 2007    (KR) .................. 10-2007-0119825

(51) Int. Cl.
*H04L 27/00* (2006.01)
*G06Q 30/00* (2006.01)
(52) U.S. Cl. .......................... 375/295; 705/26
(58) Field of Classification Search .......... 375/295; 705/26
See application file for complete search history.

(56) References Cited

U.S. PATENT DOCUMENTS

| | | | |
|---|---|---|---|
| 2003/0189994 A1* | 10/2003 | Sommer et al. | 375/341 |
| 2004/0042565 A1* | 3/2004 | Garrett | 375/341 |
| 2004/0181419 A1* | 9/2004 | Davis et al. | 705/1 |

(Continued)

FOREIGN PATENT DOCUMENTS

KR    10-2006-0108450 A    10/2006

(Continued)

OTHER PUBLICATIONS

Kim et al., Mitigating Error Propagation in Successive Interference Cancellation, Oct. 2006, pp. 2956-2960, IEICE, Trans. Commun., vol. E89-B, No. 10.

*Primary Examiner* — David C. Payne
*Assistant Examiner* — Erin File
(74) *Attorney, Agent, or Firm* — Jefferson IP Law, LLP

(57) ABSTRACT

The present invention relates to a method of detecting a candidate vector and a method of detecting a transmission symbol using the same. According to an embodiment of the present invention, in a multiple input multiple output (MIMO) system using spatial multiplexing (SM), a receiver selects candidate vectors corresponding to a layer located at a last row among a plurality of rearranged layers, and sequentially ranks constellation dots of a next layer for each of the selected candidate vectors. Then, a plurality of arbitrary constellation dots are selected from the ranked constellation dots, accumulated costs of the arbitrary constellation dots are calculated, and a candidate vector is selected in correspondence with a constellation dot having a minimal accumulated cost. Then, a new arbitrary constellation dot is selected in place of the constellation dot selected as the candidate vector, an accumulated cost of the selected arbitrary constellation dot is compared with accumulated costs of the other arbitrary constellation dots, and another candidate vector is selected.

12 Claims, 10 Drawing Sheets

U.S. PATENT DOCUMENTS

2006/0251061 A1　11/2006　Kim et al.
2007/0237272 A1　10/2007　Hwang et al.
2008/0279299 A1*　11/2008　Reuven et al. ............... 375/267
2010/0086067 A1*　4/2010　Oka ............................. 375/260

FOREIGN PATENT DOCUMENTS

| KR | 10-0659281 B1 | 12/2006 |
| KR | 10-2007-0021823 A | 2/2007 |
| KR | 10-2007-0039285 A | 4/2007 |
| KR | 10-2007-0099950 A | 10/2007 |

* cited by examiner

METHOD OF SELECTING CANDIDATE VECTOR AND METHOD OF DETECTING TRANSMISSION SYMBOL

CROSS-REFERENCE TO RELATED APPLICATION

This application claims priority to and the benefit of Korean Patent Application No. 10-2007-0119825 filed in the Korean Intellectual Property Office on Nov. 22, 2007, the entire contents of which are incorporated herein by reference.

BACKGROUND OF THE INVENTION (a) Field of the Invention

The present invention relates a method of selecting a candidate vector and a method of detecting a transmission symbol. More particularly, the present invention relates to a method of selecting a candidate vector and a method of detecting a transmission symbol in a multiple input multiple output (MIMO) system using spatial multiplexing (SM).

(b) Description of the Related Art

In recent years, a mobile communication system has been required to provide a high-speed data service including images and packets, in addition to an existing sound service. In order to satisfy these requirements, a multiple input multiple output (MIMO) system using spatial multiplexing (SM) that enables multiplex data layer transmission has attracted attention.

In the MIMO system using spatial multiplexing, a data layer indicating different information is transmitted through each transmitting antenna, and a receiving terminal separates the transmitted data layers. In the data layer separation method according to the related art, maximum likelihood (ML) bit metric detection has been used in which a maximum likelihood metric is calculated for each of transmission symbol vectors that can be combined and a transmission symbol vector having the smallest ML metric is searched, in order to perform optimal transmission symbol detection.

However, even though the ML bit metric detection provides optimal transmission symbol detection performance, since hardware complexity is exponentially increased with respect to the size of a constellation and the number of transmitting antennas, the ML bit metric detection has a drawback in that extremely high complexity is required.

In order to remedy the drawback in the ML bit metric detection, as linear signal detection having reduced complexity, a zero forcing (ZF) method and a minimum mean square estimator (MMSE) method have been suggested in the related art. However, these methods have a problem in that performance is degraded as compared with the ML bit metric detection. In order to remedy the drawback in the ML bit metric detection, as non-linear signal detection having reduced complexity, ordered successive interference cancellation (OSIC) that is known as vertical Bell Lab layered space time (VBLAST) has been suggested. However, while the VBLAST can be easily implemented and provides excellent performance than the ZF and MMSE methods, it has a problem in that performance is degraded as compared with the ML bit metric detection.

As methods that have been suggested in the related art, there are original maximum likelihood detection with QR decomposition and M-algorithm (original QRM-MLD), and QRM-MLD with ranking. However, in the original QRM-MLD, excellent transmission symbol detection performance is provided, but complexity is high. In the QRM-MLD with ranking, complexity is reduced, but transmission symbol detection performance is degraded as compared with the original QRM-MLD.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of selecting a candidate vector and a method of detecting a transmission symbol in a multiple input multiple output (MIMO) system using spatial multiplexing, having advantages of reducing complexity while improving transmission symbol detection performance. An exemplary embodiment of the present invention provides a method of selecting a candidate vector in a multiple input multiple output (MIMO) system. The method includes selecting a plurality of candidate vectors corresponding to a first layer among a plurality of layers; sequentially ranking a plurality of constellation dots corresponding to a second layer different from the first layer among the plurality of layers for each of the candidate vectors corresponding to the first layer; selecting a plurality of arbitrary constellation dots from the constellation dots ranked for each of the candidate vectors; and selecting candidate vectors corresponding to the second layer on the basis of a first arbitrary constellation dot having a minimal accumulated cost among the plurality of arbitrary constellation dots.

Another exemplary embodiment of the present invention provides a method of detecting a transmission symbol in a multiple input multiple output (MIMO) system. The method includes rearranging a plurality of layers; selecting a plurality of candidate vectors corresponding to the plurality of rearranged layers; calculating a log-likelihood ratio of the transmission symbol using the plurality of candidate vectors; and detecting the transmission symbol on the basis of the log-likelihood ratio.

The selecting of the plurality of candidate vectors includes selecting a plurality of candidate vectors corresponding to a first layer among the plurality of rearranged layers; and selecting candidate vectors corresponding to a second layer different from the first layer among the plurality of rearranged layers on the basis of an arbitrary constellation dot having a minimal accumulated cost among a plurality of arbitrary constellation dots that are selected from a plurality of constellation dots corresponding to the second layer.

According to the embodiments of the present invention, in a MIMO system using spatial multiplexing, a receiver can implement a transmission signal detection method that is capable of reducing complexity while achieving excellent performance.

DETAILED DESCRIPTION OF THE EMBODIMENTS

Figure 1:
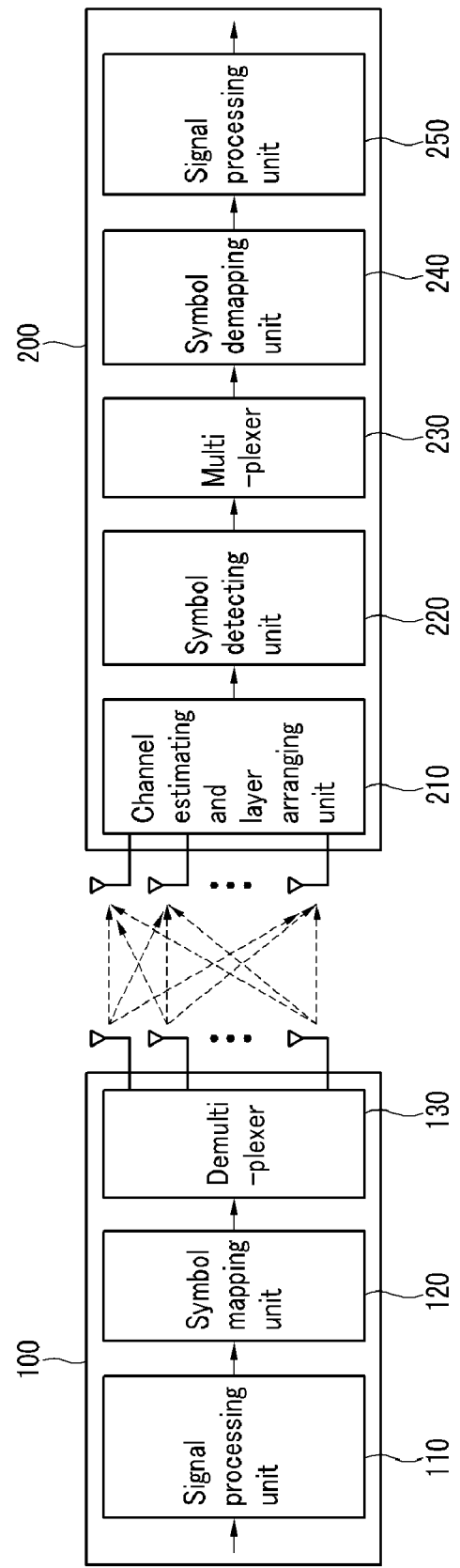
FIG. 1 is a configuration diagram illustrating a transmitter and a receiver according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "unit" and "-er (-or)" used herein mean a unit that processes at least one function or operation. This can be implemented by hardware, software, or a combination thereof.

Hereinafter, a method of selecting a candidate vector and a method of detecting a transmission symbol in a multiple input multiple output (MIMO) system using spatial multiplexing (SM) according to an exemplary embodiment of the present invention will be described in detail with reference to the accompanying drawings.

FIG. 1 is a diagram illustrating the structures of a transmitter 100 and a receiver 200 according to an exemplary embodiment of the present invention, which shows the transmitter 100 and the receiver 200 of a MIMO system.

The transmitter 100 and the receiver 200 according to the exemplary embodiment of the present invention may have a different number of transmitting/receiving antennas. However, for better comprehension and ease of description, the structures of a transmitter and a receiver will be described using a MIMO system in which the transmitter 100 has three transmitting antennas and the receiver 200 has three receiving antennas.

Referring to FIG. 1, the transmitter 100 includes a signal processing unit 110, a symbol mapping unit 120, and a demultiplexer 130.

The signal processing unit 110 performs signal processing, such as scrambling, error correction coding, and interleaving, on transmitted data, and outputs the transmitted data. In this case, the transmitted data that is input to the signal processing unit 110 means binary data that is transferred from a medium access control (MAC) layer to a physical layer.

The symbol mapping unit 120 converts the transmitted data that is processed and output by the signal processing unit 110 into high-speed symbols on the basis of a modulation method, and outputs the high-speed symbols.

The demultiplexer 130 divides the high-speed symbols that are output from the symbol mapping unit 120 into three low-speed layers on the basis of the number of transmitting antennas and outputs the three low-speed layers. The three output low-speed layers are simultaneously transmitted through the transmitting antennas, respectively. In this case, each layer means a data stream.

The receiver 200 includes a channel estimating and layer arranging unit 210, a symbol detecting unit 220, a multiplexer 230, a symbol demapping unit 240, and a signal processing unit 250.

The channel estimating and layer arranging unit 210 performs channel estimation using signals that are received in parallel through the receiving antennas, and rearranges layers and channels and outputs them. In this case, according to a method of rearranging layers, a layer having lowest reliability is arranged as a last layer, and the other layers are sequentially arranged in the order of layers having low reliability to layers having high reliability. That is, when there are three layers, the layer having the lowest reliability is arranged as the last layer, the layer having the highest reliability is arranged as the second layer, and the layer having the second highest reliability is arranged as the first layer. In the exemplary embodiment of the present invention, the reliability of layers is determined on the basis of a signal-to-noise ratio (SNR).

The symbol detecting unit 220 determines a transmission symbol using the rearranged layers and channels that are received from the channel estimating and layer arranging unit 210.

Then, the determined transmission symbol passes through the multiplexer 230 that performs a function opposite to a function of the demultiplexer 130 and the symbol demapping unit 240 that performs a function opposite to a function of the symbol mapping unit 120, and is then input to the signal processing unit 250. Then, the signal processing unit 250 outputs received data using the input signal.

Figure 2:
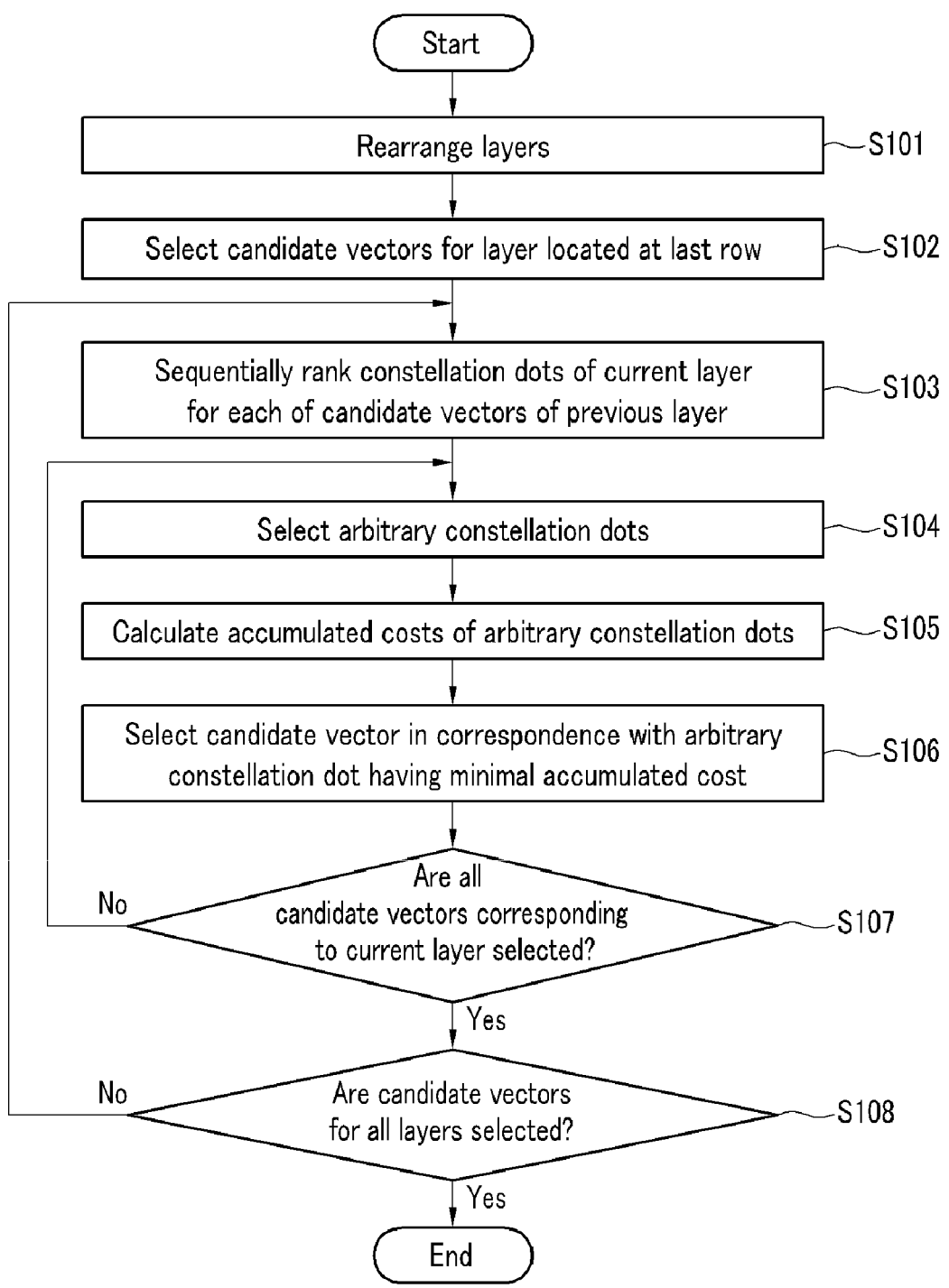
FIG. 2 is a flowchart illustrating a method of detecting a candidate vector of a transmission symbol using a receiver according to an exemplary embodiment of the present invention.
Figure 3:
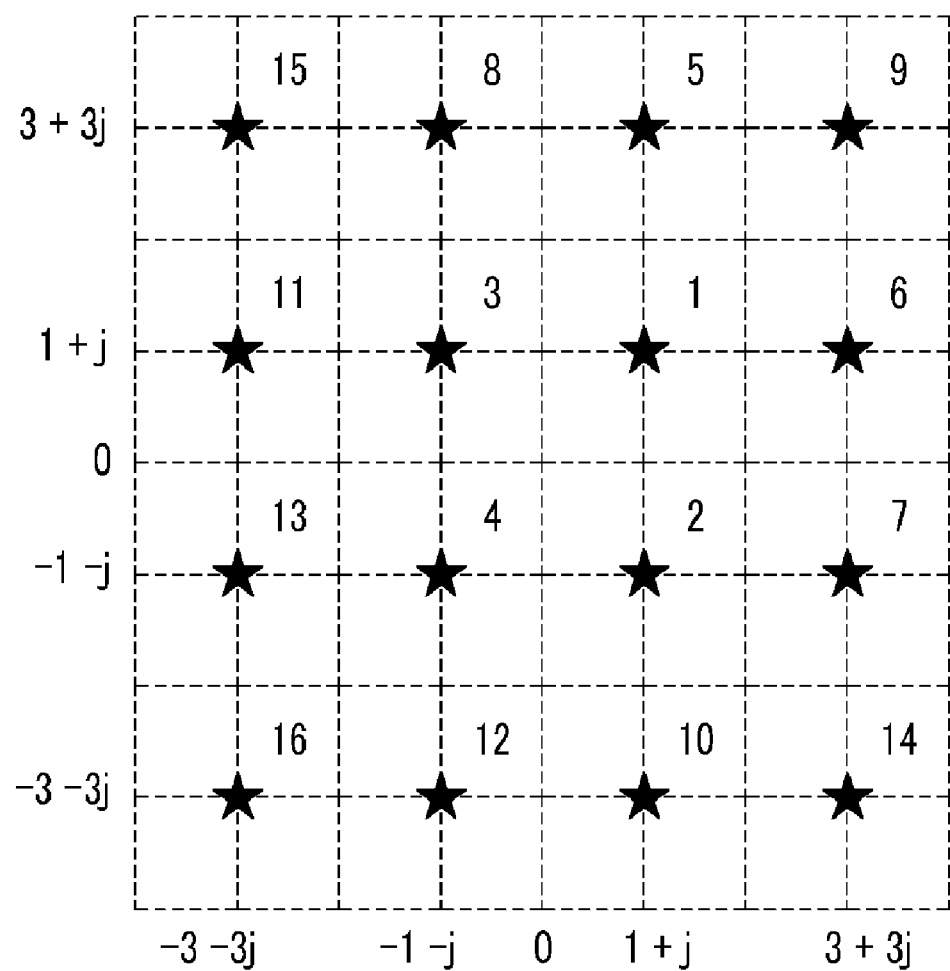
FIG. 3 is a diagram illustrating an example of a constellation according to an exemplary embodiment of the present invention.

FIG. 2 is a flowchart illustrating a method of detecting a candidate vector of a transmission symbol using a receiver 200 according to an exemplary embodiment of the present invention, and FIG. 3 is a diagram illustrating an example of a constellation according to an exemplary embodiment of the present invention. FIGS. 4 to 7 are diagrams illustrating an example of a process of selecting a candidate vector of a transmission symbol according to an exemplary embodiment of the present invention.

In the exemplary embodiment of the present invention, in order to describe the method of selecting a candidate vector, a 3×3 MIMO system is exemplified in which the number of each of the transmitting and receiving antennas is three, but the present invention is not limited thereto. The number of transmitting and receiving antennas may be changed.

Referring to FIG. 2, first, if signals are received by the antennas of the receiver 200, the channel estimating and layer arranging unit 210 performs channel estimation and layer rearrangement on the received signals (S101).

After the rearrangement, a system model can be represented by the following Equation 1.

$$y = Hx + z \quad \text{(Equation 1)}$$

In this case, $y=[y_1\ y_2\ y_3]^T$ denotes received signals, $x=[x_1\ x_2\ x_3]^T$ denotes rearranged transmission signals (layers), $z=[z_1\ z_2\ z_3]^T$ denotes noise signals, and $H=[h_1\ h_2\ h_3]^T$ denotes a rearranged channel matrix. Here, $x_3$ denotes a layer in which an SNR is lowest and reliability is low, $x_2$ denotes a layer in which an SNR is highest and reliability is high, and $x_1$ denotes a layer in which an SNR is second highest.

As described above, the channel matrix H and the layers $y=[y_1\ y_2\ y_3]^T$ that have been rearranged by the channel estimating and layer arranging unit 210 are input to the symbol detecting unit 220. Then, in order to detect a candidate vector of the transmission symbol, the symbol detecting unit 220 performs QR decomposition on the rearranged channel matrix H as H=QR. In this case, Q denotes a unitary matrix, and R denotes an upper triangular matrix in which diagonal elements are included and only upper portions have values.

Meanwhile, the symbol detecting unit 220 applies a Hermitian matrix $Q^H$ of a matrix to the received signals $y=[y_1\ y_2\ y_3]^T$ that are acquired using Equation 1, and generates a signal $\tilde{y}$, as represented by the following Equation 2.

$$\tilde{y}=Q^H y=Q^H(Hx+z)=Rx+\tilde{z} \quad \text{(Equation 2)}$$

In this case, since a matrix Q is a unitary matrix, a statistical characteristic of a noise component $\tilde{z}=Q^H z$ is not changed. Accordingly, a relationship like the following Equation 3 can be derived.

$$\begin{aligned} \|y - Hx\| &= \|y - QRx\| (\because H = QR) \\ &= \|Q^H[y - QRx]\| \\ &= \|\tilde{y} - Rx\| \end{aligned} \quad \text{(Equation 3)}$$

A cost function that is used to select a candidate vector of the transmission symbol using Equation 3 can be represented by the following Equation 4.

$$\begin{aligned} x_{ML} &= \arg\min_x \|y - Hx\| \\ &= \arg\min_x \|\tilde{y} - Rx\| \end{aligned} \quad \text{(Equation 4)}$$

Equation 4 can be represented by the following Equation 5.

$$\|\tilde{y} - Rx\|^2 = \left\| \begin{bmatrix} \tilde{y}_1 \\ \tilde{y}_2 \\ \vdots \\ \tilde{y}_{n_R} \end{bmatrix} - \begin{bmatrix} r_{1,1} & r_{1,2} & \cdots & r_{1,n_T1} \\ 0 & r_{2,2} & \cdots & \vdots \\ \vdots & \vdots & \ddots & \vdots \\ 0 & 0 & \cdots & r_{n_R,n_T} \end{bmatrix} \begin{bmatrix} x_1 \\ x_2 \\ \vdots \\ x_{n_T} \end{bmatrix} \right\|^2$$

$$= \sum_{i=0}^{n_R-1} \left| \tilde{y}_{n_R-i} - \sum_{i=0}^{i} r_{n_R-i,n_T-j} x_{n_T-j} \right|^2 \quad \text{(Equation 5)}$$

If Equation 5 is applied to the 3×3 MIMO system, it can be represented by the following Equation 6.

$$|\tilde{y}_3 - r_{3,3}x_3|^2 + |\tilde{y}_2 - r_{2,2}x_2 - r_{2,3}x_3|^2 + |\tilde{y}_1 - r_{1,1}x_1 - r_{1,2}x_2 - r_{1,3}x_3|^2 \quad \text{(Equation 6)}$$

Meanwhile, in the 3×3 MIMO system, the number of each of the transmitting and receiving antennas is three. Thus, the symbol detecting unit 220 can select a transmission symbol candidate vector through a total of three steps. In the first step, the symbol detecting unit 220 selects a candidate vector that corresponds to a layer $x_3$ located at a last row. In the second step, the symbol detecting unit 220 selects a candidate vector that corresponds to a combination $\{x_2, x_3\}$ of the layer $x_3$ located at the last row and a layer $x_2$ located at a second row on the basis of the candidate vector selected in the first step, that is, a candidate vector that corresponds to the layer $x_2$ located at the second row. Finally, in the third step, the symbol detecting unit 220 selects a candidate vector that corresponds to a combination $\{x_1, x_2, x_3\}$ of all the layers $x_1$, $x_2$, and $x_3$ on the basis of the candidate vector selected in the second step, that is, a candidate vector that corresponds to the layer $x_1$ located at the first row. In this case, in each of steps, the candidate vectors are selected by the fixed number M of candidates. In the exemplary embodiment of the present invention, four candidate vectors are selected in each of the steps (M=4). Meanwhile, in the exemplary embodiment of the present invention, if the number of transmitting and receiving antennas is changed, the number of steps of selecting candidate vectors is also changed.

The above-described process of selecting a candidate vector will be described in detail in a state where the process is divided into individual steps.

In the first step, the symbol detecting unit 220 selects as many constellation dots as the number (M=4) of candidates that can minimize a cost ($|\tilde{y}_3 - r_{3,3}x_3|^2$) among constellation dots corresponding to the layer $x_3$ located at the last row as candidate vectors (S102). In this case, when it is assumed that the selected candidate vectors are $\{x_{3,1}, x_{3,2}, x_{3,3}, x_{3,4}\}$, a cost function ($\xi_{1,i}$) of each candidate vector can be represented by the following Equation 7.

$$\xi_{1,i}=|\tilde{y}_3 - y_{3,3}x_{3,i}|^2,\ i=1,2,3,4\ \xi_{1,i}\leq\xi_{1,j},\ 1\leq i<j\leq 4 \quad \text{(Equation 7)}$$

Figure 4:
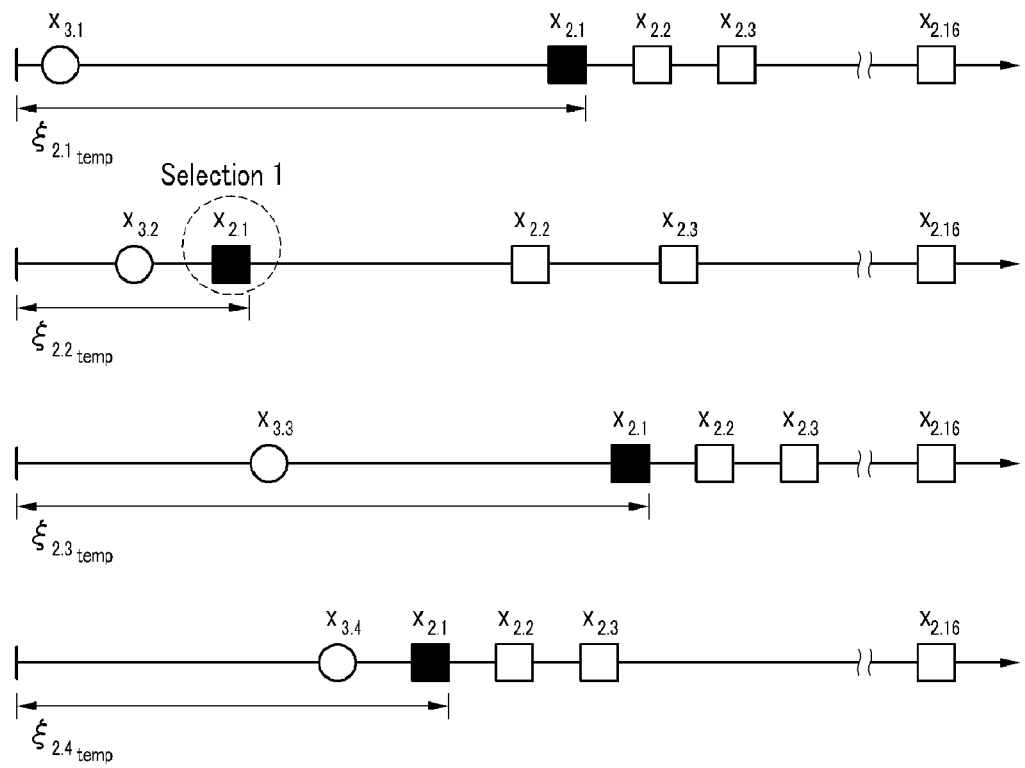
FIGS. 4 to 7 are diagrams illustrating an example of a process of selecting a candidate vector of a transmission symbol according to an exemplary embodiment of the present invention.

In the second step, the symbol detecting unit 220 ranks constellation dots ($x_{2,i}$, i=1, 2, ..., 16) corresponding to the layer $x_2$ located at the second row as shown in FIG. 3 for each of the candidate vectors selected in the previous step as shown in FIG. 4 (S103). In this case, the number of constellation dots that correspond to the second layer $x_2$ corresponds to the modulation order (C).

Then, the symbol detecting unit 220 selects a plurality of arbitrary constellation dots from the ranked constellation dots (S104). At this time, the symbol detecting unit 220 selects constellation dots located having the first turn among the constellation dots ranked for each of the candidate vectors as arbitrary constellation dots.

If the arbitrary constellation dots are selected, the symbol detecting unit 220 calculates an accumulated cost ($\xi_{2,i,temp}$, i=1, 2, 3, 4) for each of the selected arbitrary constellation dots (S105). Then, the symbol detecting unit 220 selects a candidate vector in correspondence with a constellation dot having a minimal accumulated cost among the arbitrary constellation dots (S106).

Then, the symbol detecting unit 220 excludes the constellation dot selected as the candidate vector from the arbitrary constellation dots, and selects a constellation dot having a turn after the excluded arbitrary constellation dot as a new arbitrary constellation dot. Then, the symbol detecting unit 220 calculates an accumulated cost of the newly selected arbitrary constellation dot and compares the calculated accumulated cost and accumulated costs of the other arbitrary constellation dots, thereby selecting another candidate vector.

Meanwhile, the symbol detecting unit 220 repeatedly performs the candidate vector selection process (S104 to S106) until all of the candidate vectors corresponding to the second layer $x_2$ are selected (S107).

FIGS. 4 to 7 are diagrams illustrating an example of a method of selecting a candidate vector for a layer $x_2$ located at a second row using the above-described method of selecting a candidate vector.

In the first step, if the candidate vectors $\{x_{3,1}, x_{3,2}, x_{3,3}, x_{3,4}\}$ for the layer $x_3$ located at the last row are selected, as shown in FIG. 4, the symbol detecting unit 220 sequentially ranks the constellation dots ($x_{2,i}$, i=1, 2, ..., 16) of the layer $x_2$ located at the second row for each of the candidate vectors ($x_{3,i}$, i=1, 2, 3, 4) selected in the previous step.

Then, as shown in FIG. 4, the symbol detecting unit 220 selects arbitrary constellation dots to select the first candidate vector. In FIG. 4, for each of the candidate vectors, a constellation dot ($x_{2,1}$) located having the first turn is selected as a candidate vector. Meanwhile, in FIG. 4, for convenience of denotation, names of the constellation dots are repetitively used on the basis of the order of the constellation dots ranked for each of the candidate vectors. However, the constellation dots that are denoted by the same reference numerals in FIG. 4 may mean different constellation dots on a constellation.

Meanwhile, if the arbitrary constellation dots are selected, the symbol detecting unit 220 calculates an accumulated cost ($\xi_{2, i, temp}$, i=1, 2, 3, 4) that corresponds to each of the arbitrary constellation dots. Then, the symbol detecting unit 220 selects an arbitrary constellation dot ($x_{2,1}$ corresponding to $x_{3,2}$, selection 1) having a minimal accumulated cost among the calculated accumulated costs ($\xi_{2, 1, temp}$, $\xi'_{2, 2, temp}$, $\xi_{2, 3, temp}$, $\xi_{2, 4, temp}$), that is, $[x_{2,1}\ x_{3,2}]^T$ as a candidate vector.

Figure 5:
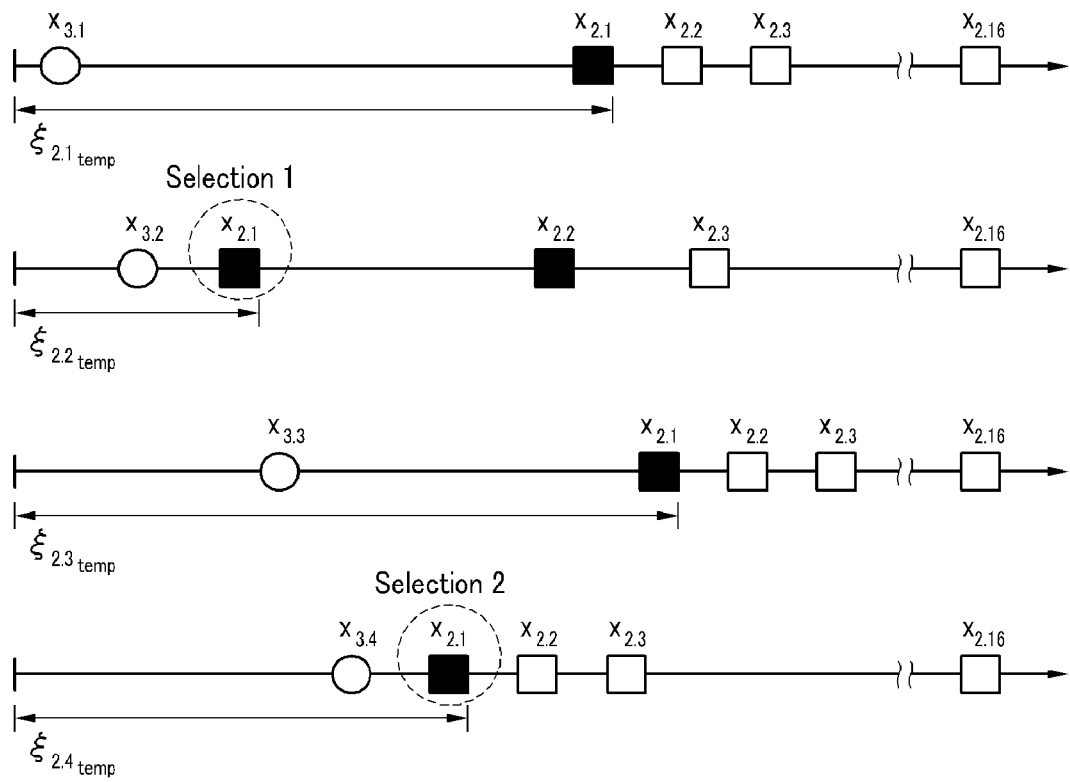

If the first candidate vector is selected, as shown in FIG. 5, the symbol detecting unit 220 excludes a constellation dot corresponding to the first selected candidate vector from the arbitrary constellation dots, and replaces the constellation dot by a constellation dot ($x_{2,2}$ corresponding to $x_{3,2}$) having a turn after the excluded arbitrary constellation dot. Then, the symbol detecting unit 220 calculates an accumulated cost ($\xi_{2, 2, temp}$) of the newly selected arbitrary constellation dot ($x_{2,2}$ corresponding to $x_{3,2}$) as represented by the following Equation 8.

$$\xi'_{2,2,temp} = \xi_{1,2} + |\tilde{y}_2 - r_{2,2}x_{2,2} - r_{2,3}x_{3,2}|^2 \quad \text{(Equation 8)}$$

If the accumulated cost of the newly selected arbitrary constellation dot ($x_{2,2}$ corresponding to $x_{3,2}$) is calculated using Equation 8, the symbol detecting unit 220 compares the accumulated costs ($\xi_{2, 1, temp}$, $\xi'_{2, 2, temp}$, $\xi_{2, 3, temp}$, $\xi_{2, 4, temp}$) of the arbitrary constellation dots and selects an arbitrary constellation dot ($x_{2,1}$ corresponding to $x_{3,4}$, selection 2) having a minimal accumulated cost, that is, $[x_{2,1}\ x_{3,4}]^T$ as a second candidate vector. In this case, except for the newly selected arbitrary constellation dot ($x_{2,2}$ corresponding to $x_{3,2}$), the accumulated costs of the other arbitrary constellation dots use the value calculated at the time of selecting the first candidate vector.

Figure 6:
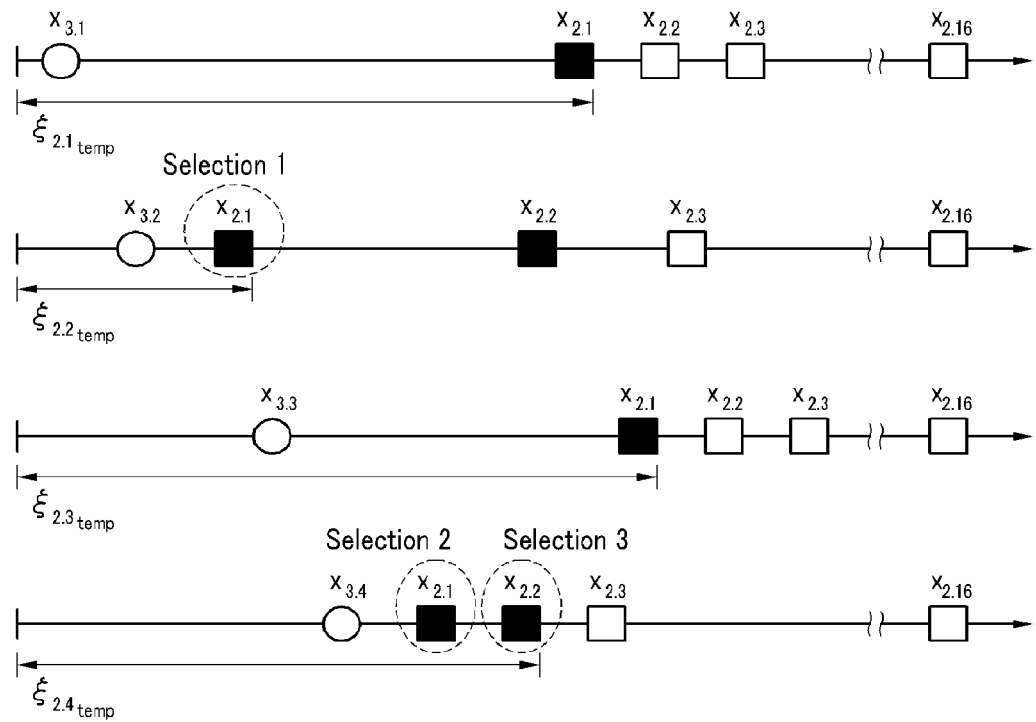
Figure 7:
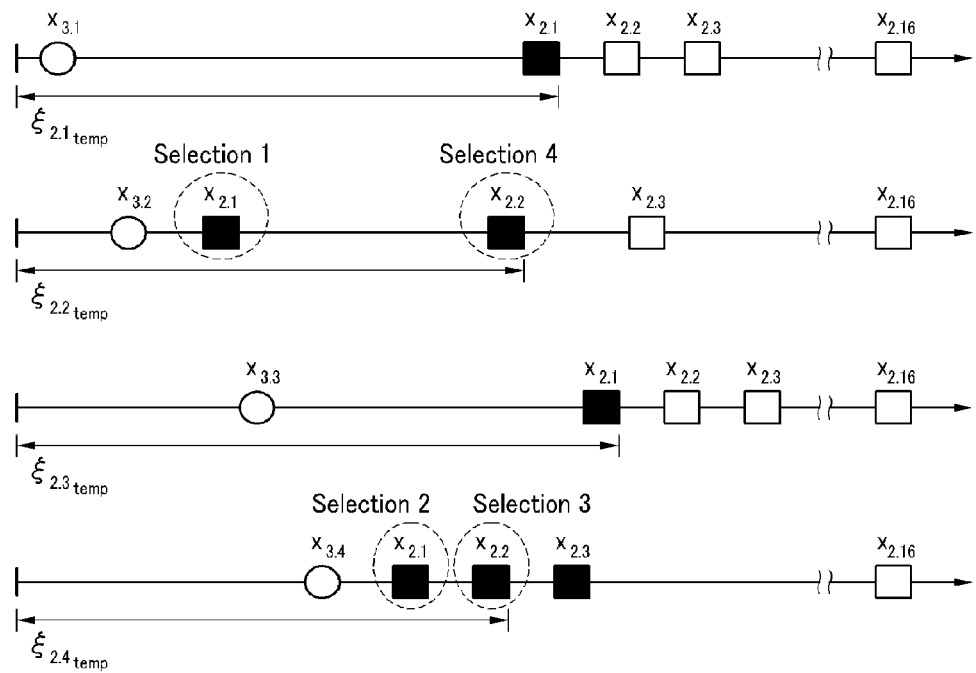

Meanwhile, as described above, if the second candidate vector is selected, as shown in FIGS. 6 and 7, the symbol detecting unit 220 selects the third and fourth candidate vectors using a method similar to the method of selecting the first and second candidate vectors.

Referring back to FIG. 2, the candidate vector selection process (S103 to S107) in the second step of selecting a candidate vector for the second layer $x_2$ is equally applied to candidate vector selection in the following steps until the candidate vectors corresponding to all the layers are completely selected (S108).

Figure 8:
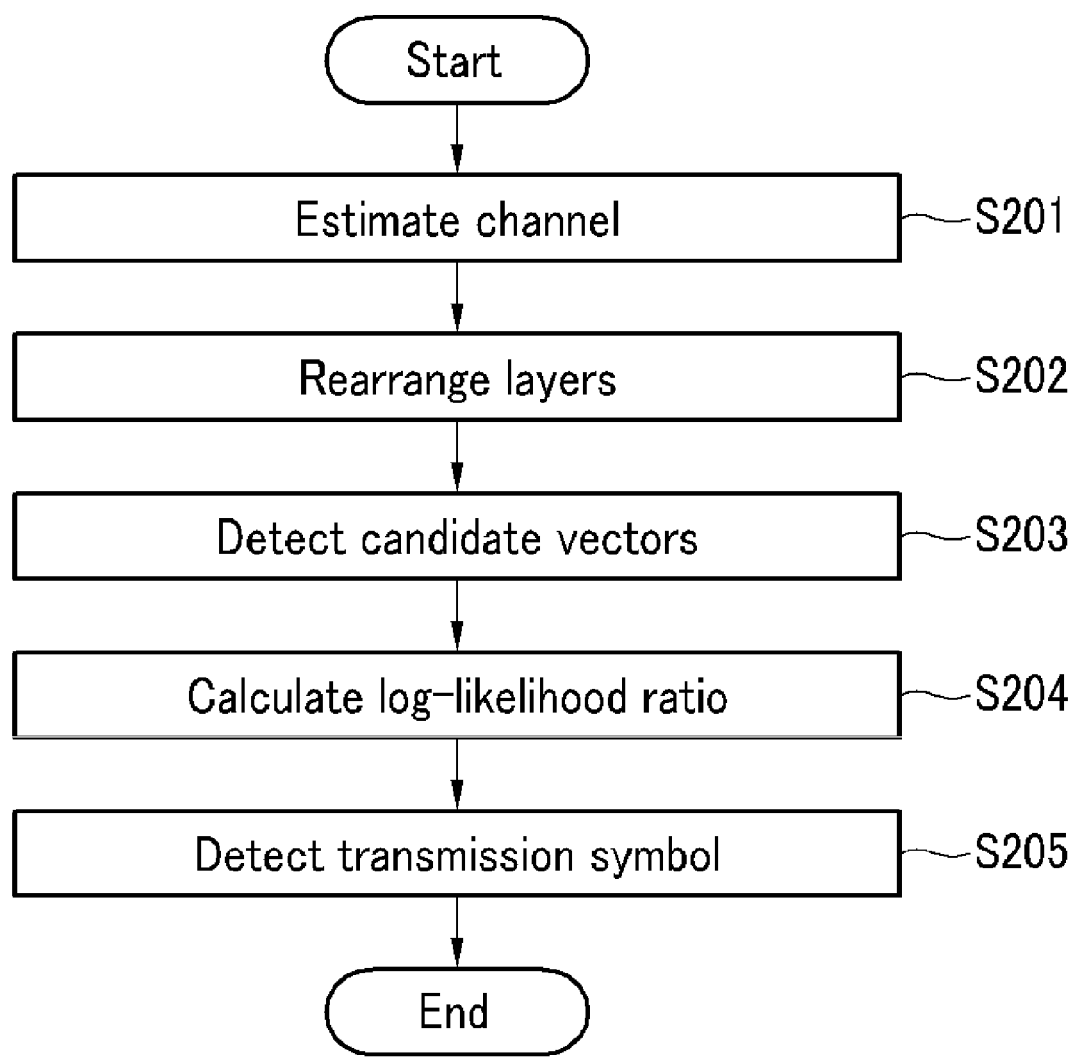
FIG. 8 is a flowchart illustrating a method of detecting a transmission symbol using a receiver according to an exemplary embodiment of the present invention.

FIG. 8 is a flowchart illustrating a method of detecting a transmission symbol using a receiver 200 according to an exemplary embodiment of the present invention.

Referring to FIG. 8, if the signals are received through a plurality of antennas, the receiver 200 uses the signals received by the channel estimating and layer arranging unit 210 to perform channel estimation (S201), and rearranges the layers (S202). In this case, the receiver 200 rearranges the layers using an SNR.

Meanwhile, if the layers are rearranged, the symbol detecting unit 220 uses the above-described method to detect candidate vectors of the transmission symbol (S203), and uses the detected candidate vectors to calculate a log-likelihood ratio corresponding to each bit of the transmission symbol (S204). Then, the symbol detecting unit 220 uses the calculated log-likelihood ratio to detect the transmission symbol (S205). The receiver 200 then outputs received data using the transmission symbol that is detected by the multiplexer 230, the symbol demapping unit 240, and the signal processing unit 250.

Figure 9:
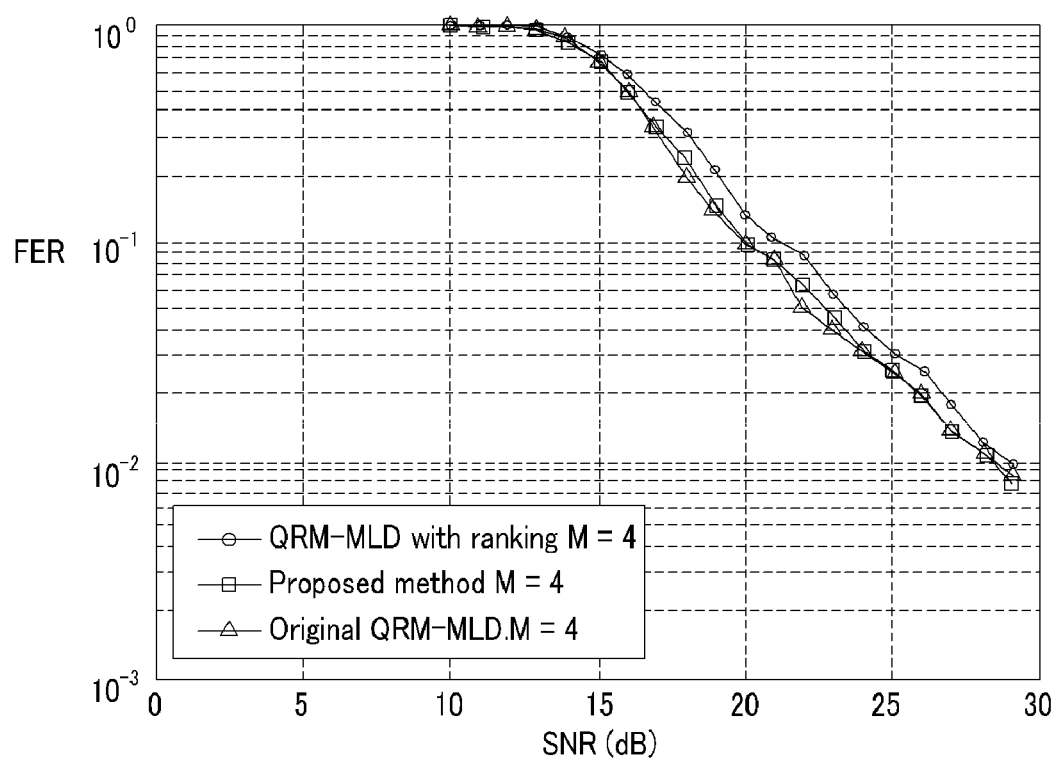
FIGS. 9 and 10 are diagrams illustrating a simulation result according to an exemplary embodiment of the present invention.
Figure 10:
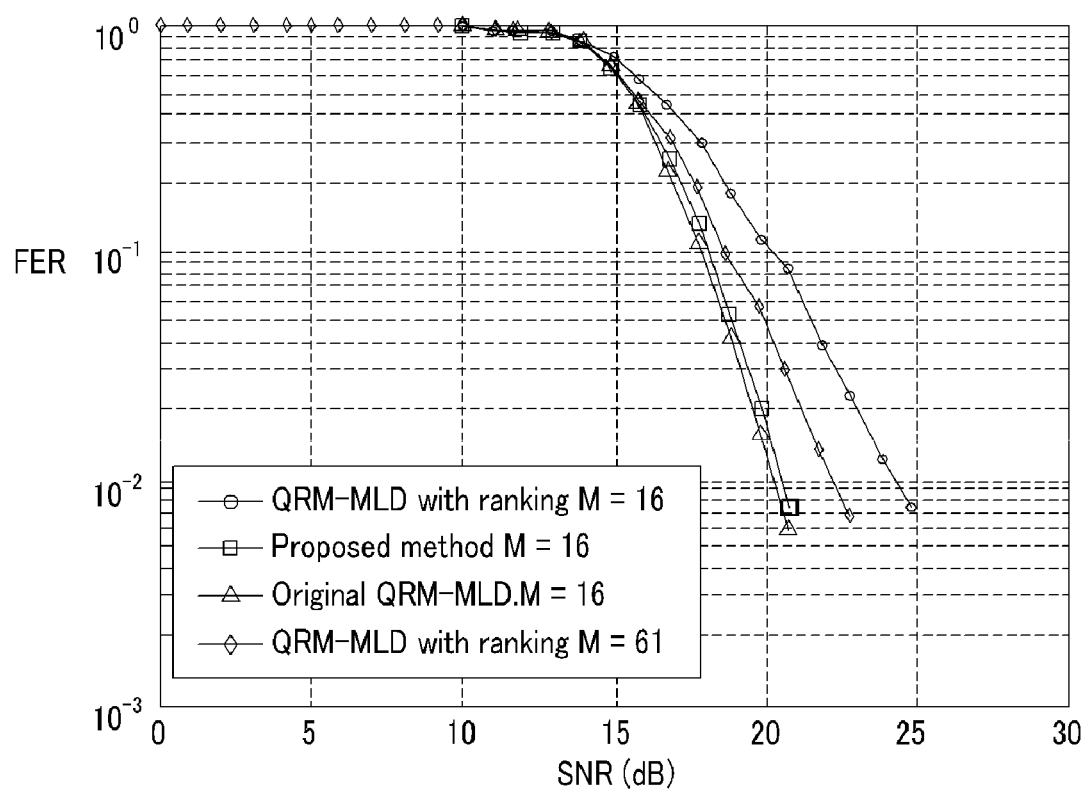

FIGS. 9 and 10 are diagrams illustrating a simulation result according to an exemplary embodiment of the present invention. Specifically, FIGS. 9 and 10 show a comparison result of frame error rates (FER) between the original maximum likelihood detection with QR decomposition and M-algorithm (original QRM-MLD) and the QRM-MLD with ranking in the related art, and a method proposed by an exemplary embodiment of the present invention.

FIG. 9 shows FERs that correspond to the above-described three detection methods in the case of M=4, and FIG. 10 shows FERs that correspond to the above-described three detection methods in the case of M=16 and an FER of the QRM-MLD with ranking in the case of M=61.

The following Table 1 shows a simulation environment according to an exemplary embodiment of the present invention.

TABLE 1

| | |
|---|---|
| System model | 4 × 4 MIMO-OFDM system |
| Channel model | Exponential power delay profile |
| Channel estimation | It is assumed that ideal channel estimation is made in receiver |
| Frame size | 10 (number of OFDM symbols) × 64 (FFT size) × 4 (number of streams) × 4 (16-QAM) × ½ (code rate) = 5120 bits |
| FFT size | 64 |
| Modulation method | 16-QAM |
| Error correction coding | Convolution coding (code rate = ½) |
| Interleaving | Bit interleaving before symbol mapping (BICM) |

Referring to Table 1, the simulation was performed in a state where the 4×4 MIMO-OFDM system using spatial multiplexing is used as a system model. In this case, an exponential power delay profile was used as a channel model, and it was assumed that ideal channel estimation is made in the receiver. Further, a frame size was 5120 bits, quadrature amplitude modulation (16-QAM) was used as a modulation method, convolution turbo coding was used as an error correction coding, and bit interleaving before symbol mapping (BICM) was performed.

Meanwhile, if comparing complexity of the three detection methods according to the number M of candidates in the above-described simulation environment, a comparison result is shown by the following Table 2.

TABLE 2

| | | |
|---|---|---|
| QRM-MLD | M = 16 | 784 |
| | M = 4 | 208 |
| QRM-MLD with ranking | M = 61 | 199 |
| | M = 16 | 64 |
| | M = 4 | 16 |
| Proposed method | M = 16 | 109 |
| | M = 4 | 25 |

Referring to Table 2, in the method proposed by the exemplary embodiment of the present invention, it can be seen that complexity is slightly increased as compared with the QRM-MLD with ranking, but is drastically decreased as compared with the original QRM-MLD. Further, in the case of the QRM-MLD with ranking (M=61), it can be seen that complexity becomes two times larger than complexity of the method (M=16) that is proposed by the exemplary embodiment of the present invention.

Referring to FIG. 9, in the case of M=4, the above-described three detection methods cannot achieve satisfactory performance. Referring to FIG. 10, in the case of M=16, it can be seen that the detection method according to the exemplary embodiment of the present invention shows performance similar to that of the original QRM-MLD, but performance is drastically degraded in the QRM-MLD with ranking. Even in the case of M=61, it can be seen that performance degradation of approximately 2 dB occurs on the basis of FER=10e−2, in the QRM-MLD with ranking.

Accordingly, according to the detection method according to the exemplary embodiment of the present invention, transmission symbol detection performance can be improved while complexity of the receiver can be reduced.

The exemplary embodiments of the present invention that have been described above may be implemented by not only a method and an apparatus but also a program capable of realizing a function corresponding to the structure according to the exemplary embodiments of the present invention and a recording medium having the program recorded therein. It can be understood by those skilled in the art that the implementation can be easily made from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of selecting a candidate vector in a multiple input multiple output (MIMO) system, the method comprising:
    selecting a plurality of candidate vectors corresponding to a first layer among a plurality of layers;
    sequentially ranking a plurality of constellation dots corresponding to a second layer that is different from the first layer among the plurality of layers for each of the candidate vectors corresponding to the first layer;
    selecting a plurality of arbitrary constellation dots from the constellation dots ranked for each of the candidate vectors; and
    selecting candidate vectors corresponding to the second layer on the basis of a first arbitrary constellation dot having a minimal accumulated cost among the plurality of arbitrary constellation dots.

2. The method of claim 1, wherein the plurality of layers are rearranged on the basis of reliability of each of the plurality of layers.

3. The method of claim 1, wherein the selecting of the plurality of arbitrary constellation dots is selecting constellation dots having a first turn among the constellation dots ranked for each of the candidate vectors as the plurality of arbitrary constellation dots.

4. The method of claim 1, wherein the selecting of the candidate vectors corresponding to the second layer includes calculating an accumulated cost for each of the plurality of arbitrary constellation dots.

5. The method of claim 1, further comprising
    repeating a process of newly selecting the plurality of arbitrary constellation dots and selecting a candidate vector on the basis of an arbitrary constellation dot having a minimal accumulated cost among the plurality of newly selected arbitrary constellation dots, until the candidate vectors corresponding to the second layer are completely selected.

6. The method of claim 5, wherein the repeating of the process comprises:
    allowing a constellation dot ranked in turn after the first arbitrary constellation dot instead of the first arbitrary constellation dot to be included in the plurality of arbitrary constellation dots;
    calculating an accumulated cost of the newly included arbitrary constellation dot; and
    selecting the candidate vectors corresponding to the second layer on the basis of the arbitrary constellation dot having the minimum accumulated cost among the plurality of arbitrary constellation dots.

7. A method of detecting a transmission symbol in a multiple input multiple output (MIMO) system, the method comprising:
    rearranging a plurality of layers;
    selecting a plurality of candidate vectors corresponding to the plurality of rearranged layers;
    calculating a log-likelihood ratio of the transmission symbol using the plurality of candidate vectors; and
    detecting the transmission symbol on the basis of the log-likelihood ratio,
    wherein the selecting of the plurality of candidate vectors includes
    selecting a plurality of candidate vectors corresponding to a first layer among the plurality of rearranged layers, and
    selecting candidate vectors corresponding to a second layer that is different from the first layer among the plurality of rearranged layers on the basis of an arbitrary constellation dot having a minimal accumulated cost among a plurality of arbitrary constellation dots that are selected from a plurality of constellation dots corresponding to the second layer.

8. The method of claim 7, wherein the rearranging of the plurality of layers is rearranging the plurality of layers on the basis of reliability of each of the plurality of layers.

9. The method of claim 8, wherein the rearranging of the plurality of layers comprises:
    arranging a layer having lowest reliability among the plurality of layers at a last row; and
    arranging the other layers at the other rows except for the last row in the order of the layers having low reliability.

10. The method of claim 7, wherein the selecting of the candidate vectors corresponding to the second layer comprises:
    sequentially ranking the plurality of constellation dots corresponding to the second layer for each of the candidate vectors corresponding to the first layer;
    selecting the plurality of arbitrary constellation dots from the constellation dots ranked for each of the candidate vectors; and
    calculating an accumulated cost for each of the plurality of arbitrary constellation dots.

11. The method of claim 7, further comprising
repeating a process of newly selecting the plurality of arbitrary constellation dots and selecting one of the plurality of newly selected arbitrary constellation dots as a candidate vector, until the candidate vectors corresponding to the second layer are completely selected.

12. The method of claim 11, wherein the repeating of the process comprises:
allowing a constellation dot ranked in turn after the arbitrary constellation dot having the minimal accumulated cost instead of the arbitrary constellation dot to be included in the plurality of arbitrary constellation dots;
calculating an accumulated cost of the newly included arbitrary constellation dot; and
selecting the candidate vectors corresponding to the second layer on the basis of the arbitrary constellation dot having the minimal accumulated cost among the plurality of arbitrary constellation dots.

* * * * *